(12) United States Patent
Epperson et al.

(10) Patent No.: US 8,788,326 B1
(45) Date of Patent: Jul. 22, 2014

(54) SYSTEM FOR HANDLING MULTIPLE SIMULTANEOUS CAMPAIGNS THAT IMPROVES ADVERTISEMENT PERFORMANCE THROUGH SHAPE BASED TARGETING AND REAL-TIME IMPRESSION ACQUISITION

(75) Inventors: Joseph W Epperson, Cary, NC (US); Kurt M Carlson, Austin, TX (US); Christopher R Farmer, Austin, TX (US)

(73) Assignee: Maxpoint Interactive, Inc., Cary, NC (US)

( * ) Notice: Subject to any disclaimer, the term of this patent is extended or adjusted under 35 U.S.C. 154(b) by 488 days.

(21) Appl. No.: 12/789,731

(22) Filed: May 28, 2010

(51) Int. Cl.
*G06Q 30/00* (2012.01)
*G06Q 90/00* (2006.01)

(52) U.S. Cl.
CPC ................................ *G06Q 90/00* (2013.01)
USPC .................................................... 705/14.1

(58) Field of Classification Search
CPC ................................................... G06Q 90/00
USPC ......................................................... 705/14.1
See application file for complete search history.

(56) References Cited

U.S. PATENT DOCUMENTS

| | | | |
|---|---|---|---|
| 8,296,180 B1 | 10/2012 | Epperson et al. | 705/14.1 |
| 2009/0089151 A1* | 4/2009 | Protheroe et al. | 705/10 |
| 2010/0114650 A1* | 5/2010 | Sherr et al. | 705/10 |
| 2010/0180013 A1 | 7/2010 | Shkedi | 709/219 |

OTHER PUBLICATIONS

International Search Report and Written Opinion, Application No. PCT/US2014/015386, 5 pages, Apr. 28, 2014.

* cited by examiner

*Primary Examiner* — Daniel Lastra
(74) *Attorney, Agent, or Firm* — King & Spalding L.L.P.

(57) ABSTRACT

A system for handling multiple simultaneous campaigns that improves advertisement performance through shape based targeting and real-time impression acquisition is disclosed. According to one embodiment, a computer-implemented method comprises receiving a bid request, creating a possible advertisement set based on the bid request, filtering the possible advertisement set to produce a reduced advertisement set, creating one or more tradezones. Creating a tradezone comprises clustering data sets according to one or more of offline data, online data, and geographic distribution of a plurality of IP addresses to form custom shapes, and mapping the custom shapes to the plurality of IP addresses. Remaining advertisements are targeted in the reduced advertisement set, wherein remaining advertisements are targeted based on a selected tradezone, and wherein the selected tradezone is selected based upon a set of parameters representative of a desired audience. The bid request is transmitted including display instructions associated with an advertisement when the bid is selected, and the advertisement is displayed.

10 Claims, 8 Drawing Sheets

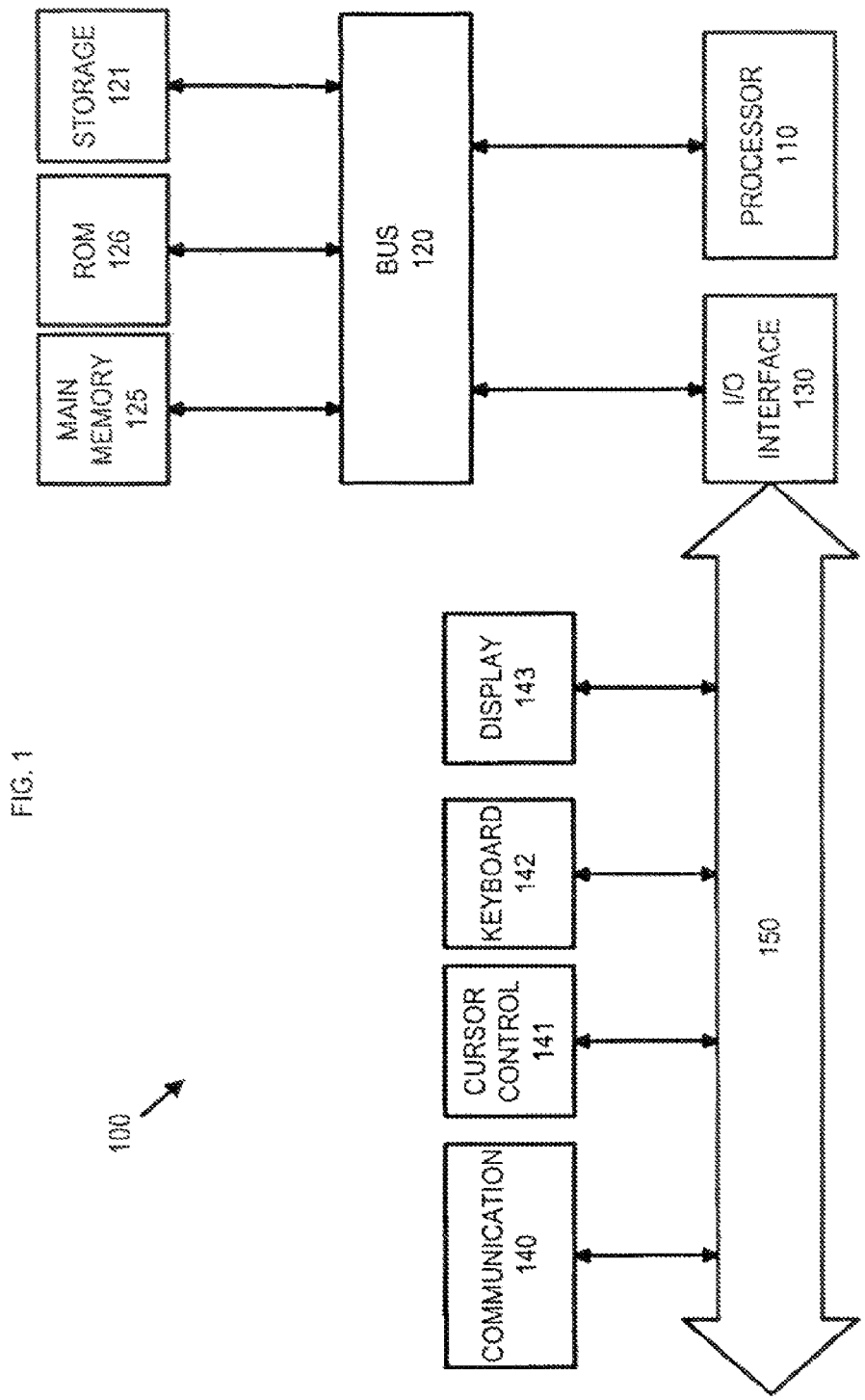

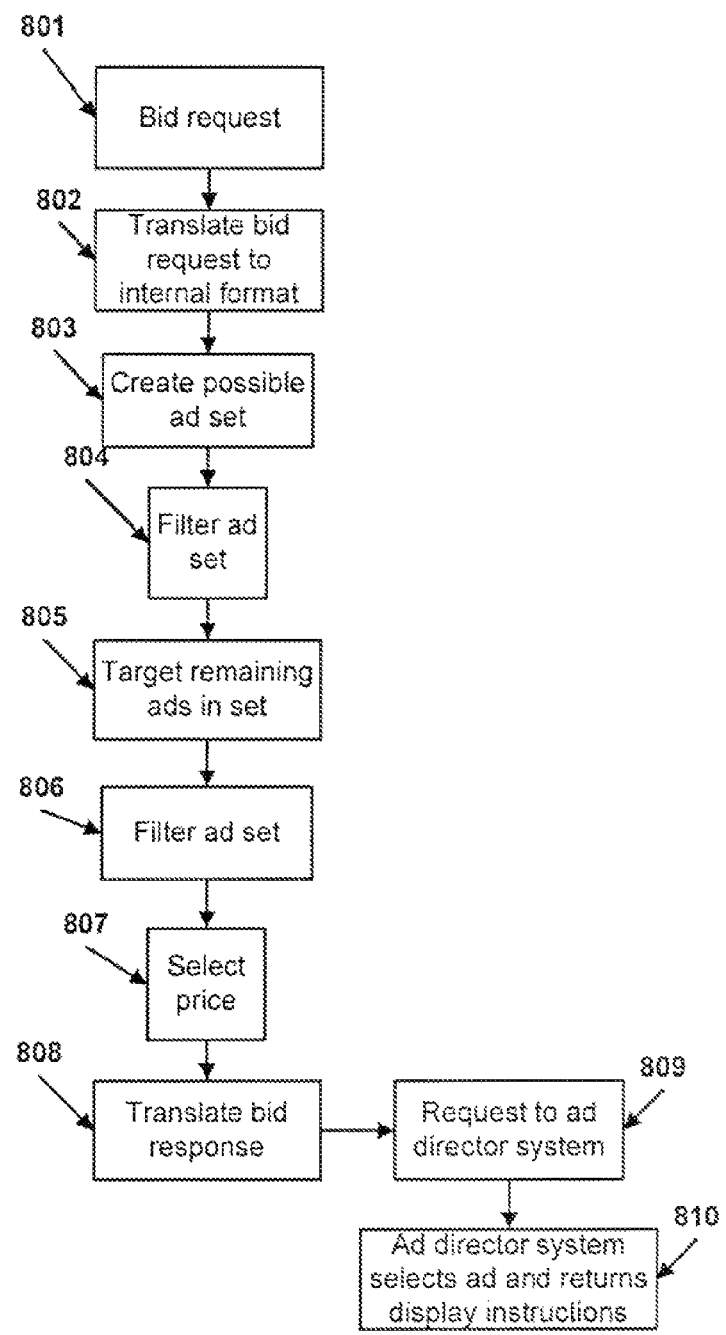

SYSTEM FOR HANDLING MULTIPLE SIMULTANEOUS CAMPAIGNS THAT IMPROVES ADVERTISEMENT PERFORMANCE THROUGH SHAPE BASED TARGETING AND REAL-TIME IMPRESSION ACQUISITION

FIELD

The field of the invention relates generally to computer systems. In particular, the present invention is directed to a system for handling multiple simultaneous campaigns that improves advertisement performance through shape based targeting and real-time impression acquisition.

BACKGROUND

Ad serving describes the technology and service that places advertisements on web sites. Ad serving technology companies provide software and/or services to web sites and advertisers to serve ads, count them, choose the ads that will make the website the most money or the advertiser the best return, and monitor progress of different advertising campaigns.

Ad servers come in two flavors: local ad servers and third-party or remote ad servers. Local ad servers are typically run by a single publisher and serve ads to that publisher's domains, allowing fine-grained creative, formatting, and content control by that publisher. Remote ad servers can serve ads across domains owned by multiple publishers. They deliver the ads from one central source so that advertisers and publishers can track the distribution of their online advertisements, and have one location for controlling the rotation and distribution of their advertisements across the web.

Behavioral targeting is currently implemented in the art by using cookies to track the pages that a browser visits on the internet and using this information to place the browser user into defined segments. These segment assignments are then used to target ads to that browser. This requires that the browser has a cookie and has been seen online before the ad call is made. Since the browser has to be seen online at some point before the ad request, behavioral targeting is limited by the number of sites that participate in the page tracking.

Contextual targeting is currently implemented in the art by passing keywords to the ad server indicating the topic of the page the ad is to display on. In some cases the ad server system may have analyzed the page content beforehand and assigned it keywords based on that analysis. The ad server uses this information to select an ad that contains matching keywords. This requires that each ad placement is setup with keywords and that each ad has keywords that will match. Contextual targeting is limited because it is targeting based on a single page's context. Contextual targeting is not able to select its audience using parameters beyond general content and page keywords of the current page.

SUMMARY

A system for handling multiple simultaneous campaigns that improves advertisement performance through shape based targeting and real-time impression acquisition is disclosed. According to one embodiment, a computer-implemented method comprises receiving a bid request, creating a possible advertisement set based on the bid request, filtering the possible advertisement set to produce a reduced advertisement set, creating one or more tradezones. Creating a tradezone comprises clustering data sets according to one or more of offline data, online data, and geographic distribution of a plurality of IP addresses to form custom shapes, and mapping the custom shapes to the plurality of IP addresses. Remaining advertisements are targeted in the reduced advertisement set, wherein remaining advertisements are targeted based on a selected tradezone, and wherein the selected tradezone is selected based upon a set of parameters representative of a desired audience. The bid request is transmitted including display instructions associated with an advertisement when the bid is selected, and the advertisement is displayed.

The above and other preferred features, including various novel details of implementation and combination of elements, will now be more particularly described with reference to the accompanying drawings and pointed out in the claims. It will be understood that the particular methods and implementations described herein are shown by way of illustration only and not as limitations. As will be understood by those skilled in the art, the principles and features described herein may be employed in various and numerous embodiments without departing from the scope of the invention.

BRIEF DESCRIPTION

The accompanying drawings, which are included as part of the present specification, illustrate the presently preferred embodiment and together with the general description given above and the detailed description of the preferred embodiment given below serve to explain and teach the principles of the present invention.

FIG. 1 illustrates an exemplary computer architecture for use with the present system, according to one embodiment.

FIG. 8 illustrates an exemplary bidding process for use with the present system, according to one embodiment.

Figure 2A:
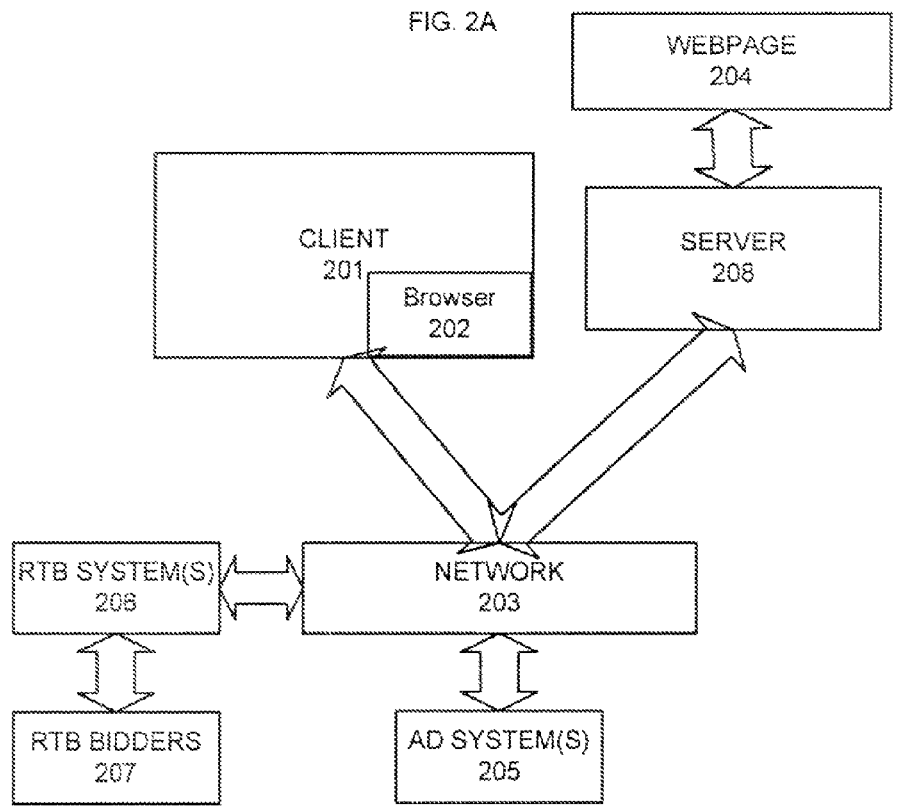
FIG. 2A illustrates an exemplary system level architecture for use with the present system, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A system for handling multiple simultaneous campaigns that improves advertisement performance through shape based targeting and real-time impression acquisition is disclosed. According to one embodiment, a computer-implemented method comprises receiving a bid request, creating a possible advertisement set based on the bid request, filtering the possible advertisement set to produce a reduced advertisement set, creating one or more tradezones. Creating a tradezone comprises clustering data sets according to one or more of offline data, online data, and geographic distribution of a plurality of IP addresses to form custom shapes, and mapping the custom shapes to the plurality of IP addresses. Remaining advertisements are targeted in the reduced advertisement set, wherein remaining advertisements are targeted based on a selected tradezone, and wherein the selected tradezone is selected based upon a set of parameters representative of a desired audience. The bid request is transmitted including display instructions associated with an advertisement when the bid is selected, and the advertisement is displayed.

According to one embodiment, the present system improves advertisement (herein referred to as "ad") performance through a shape-based targeting system that acquires pre targeted impressions and handles multiple simultaneous campaigns. The present system matches, bids on, and acquires ad impressions on an individual basis and in real-time, using a shape based targeting system. Therefore the present system enables ad campaigns to achieve improved performance by selectively acquiring impressions that, in a probabilistic sense, will reach only the desired audience for a specific campaign. Since the impression is pre-targeted to at least one campaign, wasted impressions are minimized. Improved performance is achieved without having to collect, analyze, and base targeting criteria on individual online user habits. An individual online user does not have to have been "seen" by the present system in order for the system to be effective in determining whether or not to target that user.

According to one embodiment, a user interface (UI) is provided to allow for easy use of the present system. The UI includes mechanical serving setup for ad campaigns as well as targeting parameters for internal and external users.

Targeting, according to one embodiment of the present system, uses a shape projection into the internet. Custom defined shapes (trade zones) have associated data sets that indicate various characteristics about the audiences in those shapes. Ads are targeted to audiences based on these characteristics. Unlike prior art systems, the user does not have to be seen before and page keywords are not required to target ads. This allows the present system to target users who have not been seen online before the ad call and still have an ideal audience match for a single ad impression based on any number of applied data sets.

According to one embodiment, the present system bridges online and offline data by mapping all the data to custom defined (trade zone) shapes. For online data the mapping uses the IP address to map to a trade zone shape. For offline data the mapping uses location information in the offline data set to map to a trade zone shape. Examples of online data include but are not limited to clicks, impressions, and pages visited. Examples of offline data include but are not limited to demographic data, point of sale data, and business information data.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. A method is here, and generally, conceived to be a self-consistent process leading to a desired result. The process involves physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present method and system also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the method and system as described herein.

FIG. 1 illustrates an exemplary computer architecture for use with the present system, according to one embodiment. One embodiment of architecture 100 comprises a system bus 120 for communicating information, and a processor 110 coupled to bus 120 for processing information. Architecture 100 further comprises a random access memory (RAM) or other dynamic storage device 125 (referred to herein as main memory), coupled to bus 120 for storing information and instructions to be executed by processor 110. Main memory 125 also may be used for storing temporary variables or other intermediate information during execution of instructions by processor 110. Architecture 100 also may include a read only memory (ROM) and/or other static storage device 126 coupled to bus 120 for storing static information and instructions used by processor 110.

A data storage device 125 such as a magnetic disk or optical disc and its corresponding drive may also be coupled to computer system 100 for storing information and instructions. Architecture 100 can also be coupled to a second I/O bus 150 via an I/O interface 130. A plurality of I/O devices may be coupled to I/O bus 150, including a display device 143, an input device (e.g., an alphanumeric input device 142 and/or a cursor control device 141).

The communication device 140 allows for access to other computers (servers or clients) via a network. The communication device 140 may comprise one or more modems, network interface cards, wireless network interfaces or other well known interface devices, such as those used for coupling to Ethernet, token ring, or other types of networks.

FIG. 2A illustrates an exemplary system level architecture for use with the present system, according to one embodiment. A client device 201 having a browser 202 can view a webpage 204 hosted by a server 208. The server 208 is in communication with a network 203, the client 201 is in communication with the network, and one or more ad systems 205 are in communication with the network 203. The client device 201 can communicate with an RTB (real time bidding) system 206, and the RTB system (or systems) 206 is in communication with the network. The RTB system (or systems) 206 is in communication with one or more RTB bidders 207.

Figure 2B:
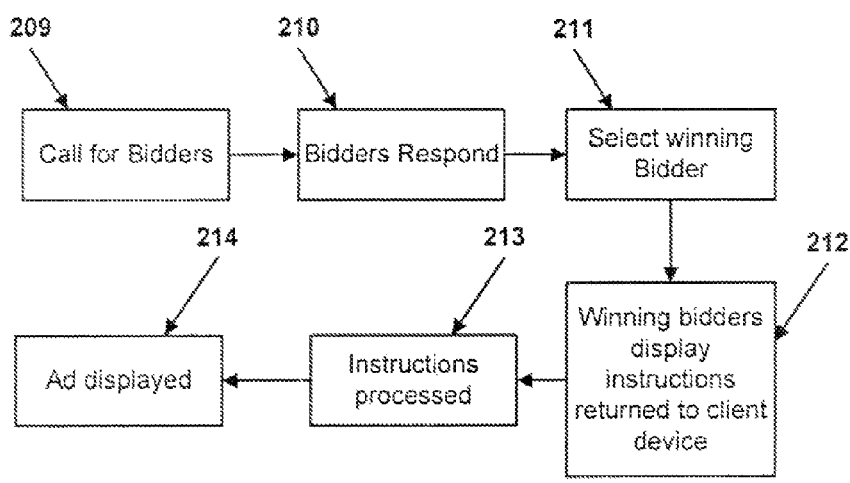
FIG. 2B illustrates an exemplary auction process for use with the present system.

FIG. 2B illustrates an exemplary auction process for use with the present system. An RTB system calls one or more RTB bidders 209 to hold an auction for each advertisement impression. Bidders respond 210 within a set period of time, for example 10-100 ms depending on the system and network latency between the servers. A bidder is selected 211. According to one embodiment, the highest, and usually the fastest, bidder wins the auction. The winning bidder's display instructions are returned to the client device 212 and processed 213 to display an ad 214. As an example, the display is rendered by returning HTML or JavaScript that calls to an ad system(s) to render the final display. Multiple ad systems may be called with the final ad system displaying the ad. The ad system tracks metrics about the ad and performance, according to one embodiment.

Figure 3:
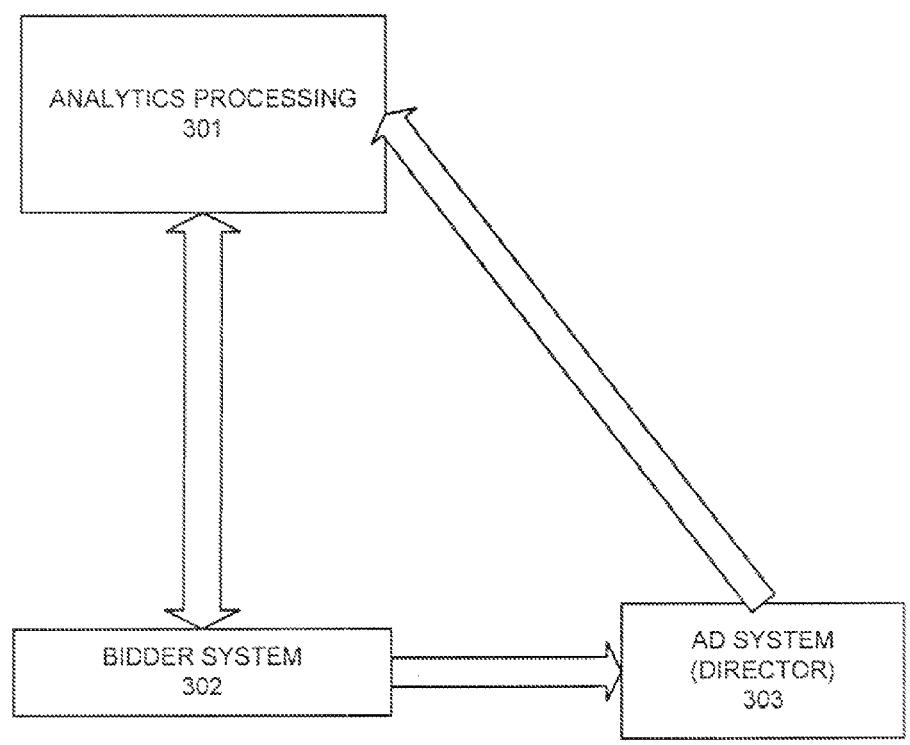
FIG. 3 illustrates an exemplary provider system layout for use with the present system, according to one embodiment.

FIG. 3 illustrates an exemplary provider system layout for use with the present system, according to one embodiment. An analytics processing system 301 runs any number of algorithms using data from a bidder system 302 and/or ad system 303 and/or data sets associated by (trade zone) shapes. The output of the algorithms are configurations that are loaded into the bidder system 302 and ad system 303 to execute when performing bidding and ad decision processing. The ad system 303 can provide further refinement of campaign selection and/or serve the ad. The ad server may defer to another ad server to display the ad after the decision is made if needed. Ad metrics are tracked by these systems, according to one embodiment. Examples of ad metrics include but are not limited to impressions delivered, clicks, and price per impression.

According to one embodiment, configurations are constructed by the analytics processing system 301. During construction of the configuration for one or more campaigns, all data sets and the IP address space are mapped to custom defined geographic shapes. These shapes are not confined to any external pre-existing geographic shapes and can therefore be constructed to best meet the system needs and/or campaign performance optimization. According to one embodiment, areas are analyzed on one or more sets of data parameters and similar areas are combined into a shape. Tradezones are constructed from smaller shapes that are too small to realistically represent an IP range mapping due to the nature of IP distribution. When aggregating smaller shapes to construct the tradezones, consideration includes but is not limited to the geographic areas that best conform to the probable distribution of the IP address ranges, the demographic homogeneity of the individual shapes that are aggregated to form the tradezone, natural geographic boundaries that can create segmentations for targeting, types of IP address ranges including, by way of example, business, residential, or public location assigned to the IP addresses, and any other factors that can be used to identify similarities between the individual shapes. Combining the smaller shapes into larger shapes creates a targeting shape. This delivers a more realistic view of both the areas reached by the assigned IP addresses and the probable audience within the constructed shape.

One example of tradezone construction is to use census tracts or block groups as the building blocks to create the tradezone shapes. Using IP location data, in combination with but not limited to business location data, IP ranges can be mapped into one of the smaller shapes or a "primary" shape. The surrounding shapes without direct IP mappings are assigned to this "primary" shape using both proximity factors and other data sets (such as demographic data encompassing income, education level). Assigning the other shapes to the primary shape creates the groupings of individual shapes that become the tradezone shape. Multiple data sets may be used to create decision criteria for grouping the shapes. The shapes are contiguous to accurately capture the possible distribution of the IP addresses. Once the tradezone shapes are constructed, IP mappings can be updated frequently when new IP and/or other data sets become available.

An unlimited number of datasets can be mapped into the shapes using spatial relationships to establish an unlimited number of distinguishing characteristics about the shapes. The shapes also have a mapping to IP ranges that allow targeting to be executed by the bidders and ad system. Some or all of the datasets can be used in the algorithms that produce ad campaign configurations. Each new dataset provides another set of parameters that can be used in determining a configuration.

The custom groupings and shapes are more effective than commonly used external static definitions of geographic areas because they are not tied to any one data set's definition and can be constructed to better approximate true online groupings based on shared characteristics such as demographic profile, IP address distribution or consumption patterns. They can also be changed and/or updated as needed. These shapes allow for an unlimited number of data sets to be added to a shape mapping and used in combination. Datasets can be added to the system at anytime.

According to one embodiment, the shape-based IP mappings are enhanced based on other dimensions. These additional dimensions are added on top of a base mapping that already incorporates shapes. An example of an additional dimension is type of IP address. Examples of types of IP addresses include but are not limited to business, residential, and public.

According to one embodiment, the final output is a data profile of the desired audience. The data profile is mapped to the shapes which are then mapped to IP groups such that when there is a potential match with an IP address in the configuration, the bidder or ad system can target the request.

According to one embodiment, the system "finds" impression matches that are a good "fit" by projecting across the data sets to shapes that have similar profiles for the data sets or parameters being used. This applied decision criteria is independent of specific geography. As an example, a data set may identify a shape in Ames, Iowa that has a similar profile to a shape in a Santa Fe, N. Mex. over the same parameter set, so both of the shapes and thus their IP ranges can be included in the configuration for targeting. As another example, during an ad campaign tradezones that are determined to be responsive to a particular advertising message can then be compared to other tradezones that contain similar combinations of characteristics. These similar or "look-alike" tradezones can then also be targeted by the ad campaign.

According to one embodiment, the present matching process allows bidding or ad decisions on individual impressions to be made based on whether or not the operator of a browser—in a probabilistic sense—is likely to share the characteristics of the desired audience profile. Using a probabilistic approach enables configurations for bidding and ad selection that encompass a wider range of audience than traditional systems have. Decisions are made on impressions that "look enough like" the desired data profile, rather than definitively belonging to a specific data set (i.e. a cookie-based decision). This "look alike" method allows the system to buy impressions in volumes that can support campaigns and still maintain campaign performance by focusing the targeting on the desired audience.

According to one embodiment, additional filtering is based on contextual information, in addition to the basic profile information. For example, an IP address may map to the desired profile, but the impression on a publisher site, or page within a publisher site, that is not desired for a specific campaign.

According to one embodiment, bid price is determined by the highest remaining campaign price after all filtering is completed. The price a campaign will pay is determined per campaign per page along with other characteristics of the impression such as size or placement on the page. If multiple campaigns overlap, or can be shown to a single impression, the bidders and/or ad systems can select the final campaign for the impression by using a selection algorithm to complete the selection. Examples of selection algorithms include but are not limited to weighted, random, and sequential. The ad serving system can also use the winning price as an input to its algorithm. In this way, multiple campaigns can be run on the bidding/ad server platforms simultaneously.

Figure 4:
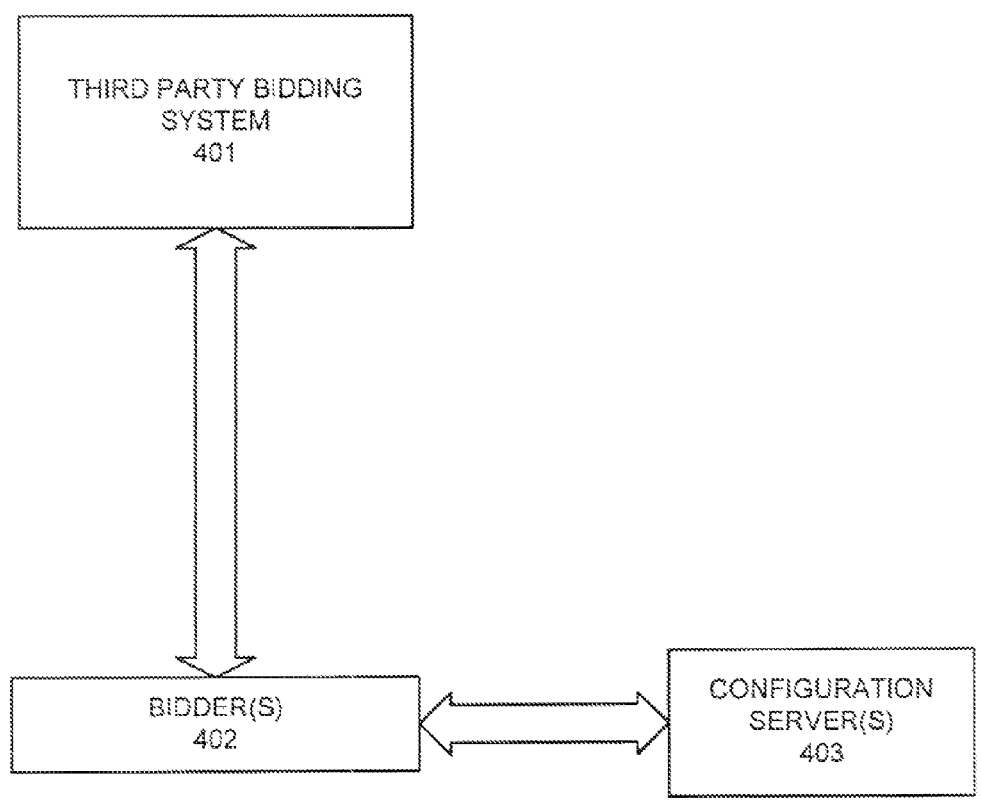
FIG. 4 illustrates an exemplary real time bidding (RTB) bidder system for use with the present system, according to one embodiment.

FIG. 4 illustrates an exemplary real time bidding (RTB) bidder system for use with the present system, according to one embodiment. A third party bidding system 401 is in communication with a bidder 402, and the bidder 402 is in communication with a configuration server 403. It is noted that a bidding system 401 can be in communication with multiple bidders 402, and a bidder 402 can be in communication with multiple configuration servers 403. A third party bidding system 401 is also referred to as an "advertising exchange." Third party bidding systems 401 offer to sell impressions for publishers by enlisting provider companies to implement bidders 402 to bid on impression requests on their systems. A configuration server 403, according to one embodiment, is a system that contains configuration information about campaigns to be used by the bidders 402 for impression purchase decisions. To make lookups over large amounts of data (millions of rows per campaign) faster, the configuration servers 403 keep all of the configurations loaded in memory, organized in a way to provide optimal lookup. As an example, a database such as MySQL can be configured to keep all the tables in memory. As another example, a custom cache server can be written to keep all of the data in memory in a manner that is optimized for fast lookups. According to one embodiment, multiple configuration servers 403 that either duplicate and/or partition the data by campaign exist.

Figure 5:
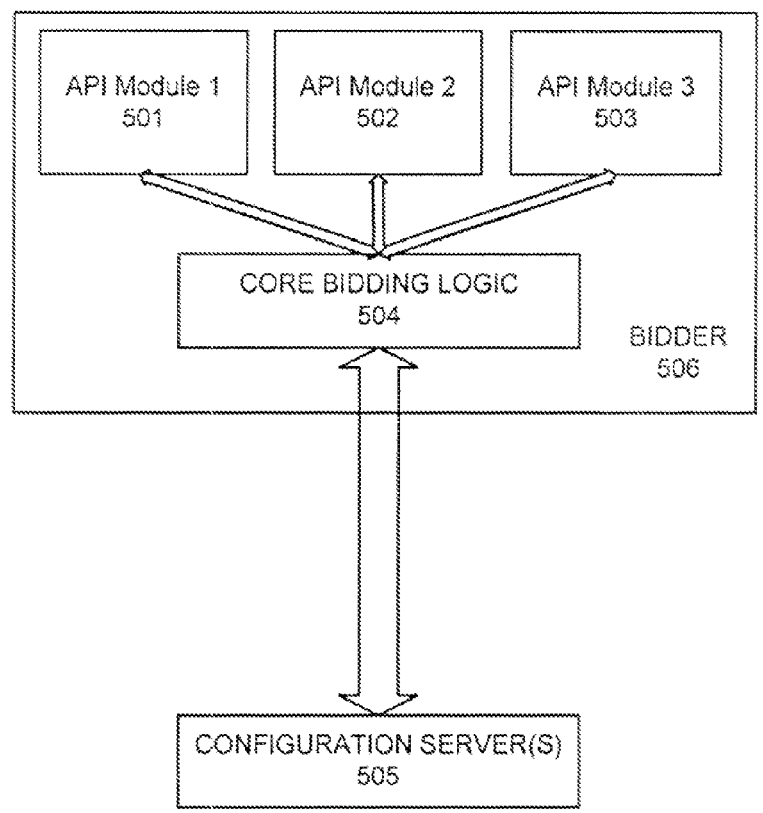
FIG. 5 illustrates an exemplary bidder for use with the present system, according to one embodiment.

FIG. 5 illustrates an exemplary bidder for use with the present system, according to one embodiment. A bidder 506 is in communication with one or more configuration servers 505. A bidder 506 processes requests to bid on impressions from a third party bidding system 401 to determine if it should bid on the impression based on its current configurations for running campaigns. Bidders 506 support multiple bidding API's because of the API module layer. A bidder has multiple API modules 501, 502, 503 in the API module layer. The API module layer is able to translate a request from a specific API into a software structure that the core system can use, and then translate the response back into the specific API format. To support a new bidding API, only a new API Module needs to be added to the bidder 506.

The bidder 506 uses core bidding logic 504 for bidder processing. During bidder 506 processing, a bid request is sent to the bidder 506. The bidder 506 filters it against mechanical constraints, including but not limited to size, creative type, and allowed destinations. The bidder 506 filters remaining ads against current configurations. Finally, a bid is executed if the result set of this second filter is not empty.

Figure 6:
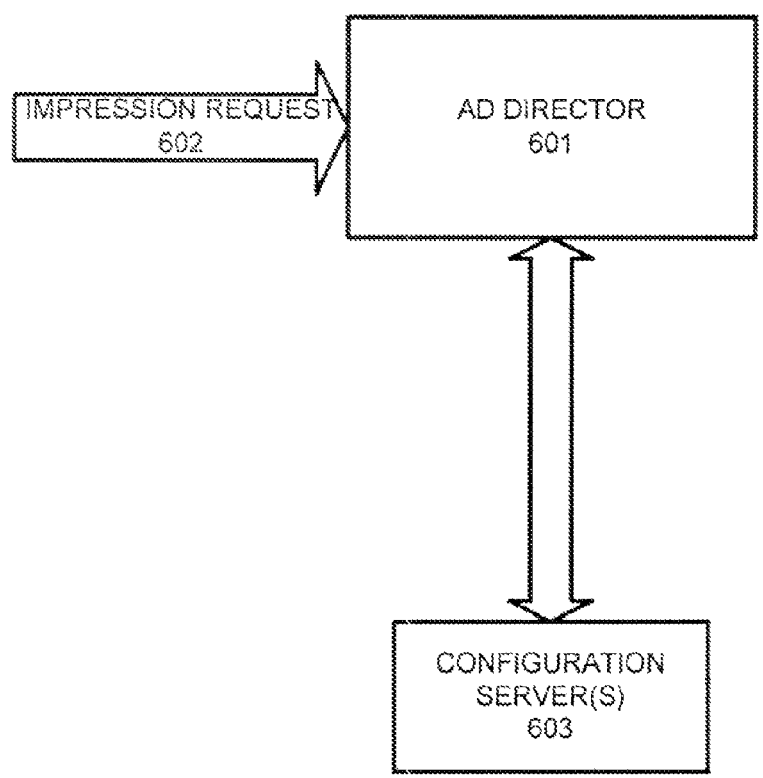
FIG. 6 illustrates an exemplary advertisement decision system for use with the present system, according to one embodiment.

FIG. 6 illustrates an exemplary advertisement system for use with the present system, according to one embodiment. According to one embodiment, an ad system can work independently or in conjunction with the RTB systems. The ad system uses the campaign configuration information to target and select a campaign ad to display to fill an impression request 602. An ad system 601 is in communication with one or more configuration servers 603. A request to fill an impression 602 is received by the ad system 601. The ad system 601 filters campaigns by mechanical constraints, examples include but are not limited to size and browser. The ad system 601 filters remaining ads against current campaign configurations. An ad is selected from the result set, and the ad is served to a client by an ad server that contains the ad.

Figure 7:
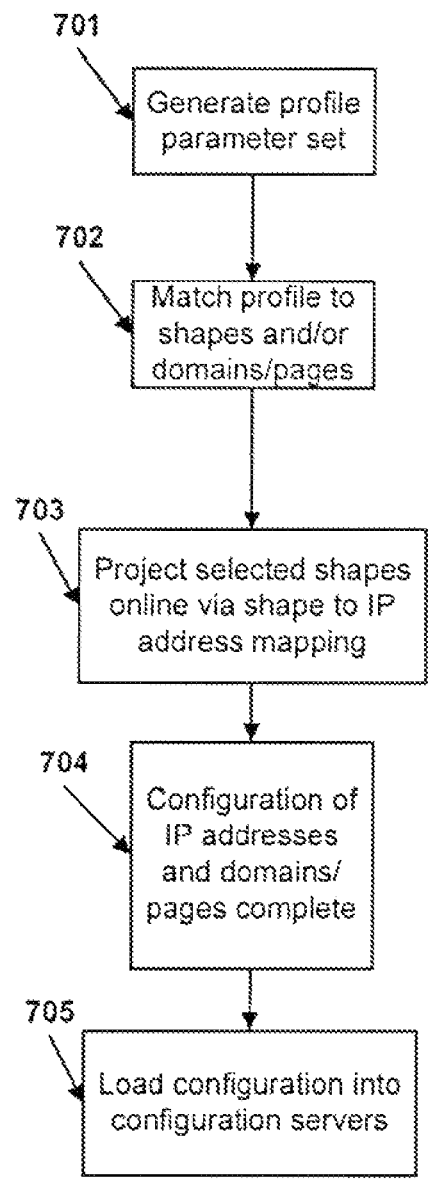
FIG. 7 illustrates an exemplary configuration process for use with the present system, according to one embodiment.

FIG. 7 illustrates an exemplary configuration process for use with the present system, according to one embodiment. A profile parameter set is generated 701 via manual or automated means. Manual means can include selection by a customer, and automated means can include feedback based means. The profile parameter set is used to match the profile to shapes (trade zones) and/or domains/pages 702. The selected shapes (trade zones) are projected online via shape to an IP address mapping 703. The selected domains/pages create a rule that is added to the configuration. The configuration of IP addresses and domains/pages is complete 704 and the configuration targets an ad campaign. The configuration is loaded into configuration servers 705 for ad systems and bidders to use for targeting.

FIG. 8 illustrates an exemplary bidding process for use with the present system, according to one embodiment. A bid request is received 801 and the bid request is translated from API specific to an internal format 802. A possible ad set is created 803 and the ad set is filtered against the bid request 804. The filtering of the ad set is performed using mechanical constraints such as size, creative, type, and allowed sites, according to one embodiment. The remaining ads in the set are targeted 805 using the IP address and configuration servers. The ad set is filtered using targeting information 806. Price is selected 807 from remaining ads in the set and a bid is made (if empty set, pass). The bid response is translated from internal format to API specific format 808, and the request is directed to the ad system 809 upon winning the bid. The ad system selects the final ad and returns display instructions for the ad to the client 810.

A system for handling multiple simultaneous campaigns that improves advertisement performance through shape based targeting and real-time impression acquisition has been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

We claim:

1. A computer implemented method, comprising:

creating a plurality of tradezones for targeting a target audience based on custom geographic shapes, wherein creating a tradezone of the plurality of tradezones comprises clustering data sets according to one or more of offline data, online data, and IP location data, wherein offline data comprises location information and references to location information, and wherein online data comprises online activity data associated with an IP address;

assigning secondary geographic shapes to primary geographic shapes to form the custom geographic shapes based on the data sets, wherein the secondary geographic shapes and the primary geographic shapes are adjacent;

assigning a plurality of IP addresses of the primary geographic shapes to the secondary geographic shapes; and mapping the custom geographic shapes to the plurality of IP addresses;

determining a matching tradezone from the plurality of tradezones based upon a set of parameters representative of the target audience; and receiving a real-time bid request from a bid partner to display an advertisement to the target audience.

2. The computer-implemented method of claim 1, wherein the online data and the offline data are independent of cookies and prior awareness of an IP address.

3. The computer-implemented method of claim 1, wherein an impression is purchased after the bid request is selected, and wherein the impression is an opportunity to display the advertisement to the target audience.

4. The computer-implemented method of claim 1, wherein the data sets define or reference geographic shapes.

5. The computer-implemented method of claim 1 further comprising projecting the data sets to a second matching tradezone having similar data sets of the matching tradezone.

6. A system, comprising:

a server, hosting a webpage, in communication with a network, wherein a client device is accessing the webpage via the network;

an advertisement system in communication with the network; and a real time bidding system in communication with the network and a plurality of real-time bidders via the network, wherein the real time bidding system:

creates a plurality of tradezones for targeting a target audience based on custom geographic shapes, wherein the real time bidding system creates a tradezone of the plurality of tradezones by clustering data sets according to one or more of offline data, online data, and IP location data, wherein offline data comprises location information and references to location information, and wherein online data comprises online activity data associated with an IP address;

assigning secondary geographic shapes to primary geographic shapes to form the custom geographic shapes based on the data sets, wherein the secondary geographic shapes and the primary geographic shapes are adjacent;

assigning a plurality of IP addresses of the primary geographic shapes to the secondary geographic shapes; and mapping the custom geographic shapes to the plurality of IP addresses;

determines a matching tradezone from the plurality of tradezones based upon a set of parameters representative of the target audience; and receives a bid request from the plurality of real-time bidders for displaying an advertisement to the target audience.

7. The system of claim 6, wherein the online data and the offline data are independent of cookies and prior awareness of an IP address.

8. The system of claim 6, wherein an impression is purchased after the bid request is selected by the real-time bidding system, and wherein the impression is an opportunity to display the advertisement to the target audience.

9. The system of claim 6, wherein the data sets define or reference geographic shapes.

10. The system of claim 6, wherein the real-time bidding system further projects the data sets to a second matching tradezone having similar data sets of the matching tradezone.

* * * * *